United States Patent Office 3,763,096
Patented Oct. 2, 1973

3,763,096
CHLORINE-CONTAINING, THERMOSTABILIZED POLYMERS
Egon Norbert Petersen, Neunkirchen-Seelscheid, Germany, assignor to Dynamit Nobel Aktiengesellschaft, Troisdorf, Germany
No Drawing. Filed Jan. 20, 1972, Ser. No. 219,499
Claims priority, application Germany, Jan. 27, 1971, P 21 03 678.2
Int. Cl. C08f 45/58
U.S. Cl. 260—45.95 L          10 Claims

ABSTRACT OF THE DISCLOSURE

Thermostabilized chlorine-containing polymer containing as a thermostabilizing agent in an amount effective to improve the thermostability thereof, a polyhydroxyalkyl substituted benzene of the formula

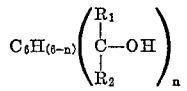

wherein $R_1$ and $R_2$ represent hydrogen or lower alkyl and $n$ is 2 to 6.

BACKGROUND

The present invention relates to the stabilization of chlorine-containing vinyl polymers against degradation by heat.

Chlorine-containing organic polymers of high molecular weight, such as polyvinyl chloride and its copolymers, polyvinylidene chloride and copolymers thereof, and postchlorinated polyvinyl chloride, chlorinated polyolefins, etc., have to be stabilized against thermal decomposition for virtually all applications, even when they contain other additives, e.g., for the purpose of improving impact toughness or light stability.

The stabilization of polyvinylidene chloride and its copolymers is especially difficult. A considerable number of substances of many different classes of compounds have been proposed to improve the thermal stability of polyvinylidene chloride, such as epoxy compounds, phosphates, saturated and unsaturated alcohols, and polyhydroxyl compounds. Alkinediols, for example, have been proposed, either alone or in combination with other additives, as polyhydroxyl compounds to serve as thermostabilizers for polyvinylidene chloride (German Auslegeschrift 1,068,887, Brit. Pat. 764,233, W. German Pat. 802,893). Polyvalent saturated alcohols, such as tetraethyleneglycol, mannitol or sorbitol, are known as deactivators for iron compounds in the stabilization of polyvinylidene chloride (Swedish Pat. 122,576). Polyvalent aliphatic alcohols with up to 9 hydroxyl groups promote the HCl acceptor effect of epoxy stabilizers (U.S. Pat. 2,734,881).

Polyhydroxyl compounds such as trimethylolpropane and dipentaerythritol are particularly effective components in stabilizer mixtures (German Auslegeschrift 1,190,659, French Pat. 1,399,240). Glycol ethers of glycerin, pentaerythritol or mannitol are said to have a thermal-stabilizing effect in polyvinylidene chloride even in the presence of iron (U.S. Pat. 2,459,746). Tertiary alcohols with up to 12 carbon atoms have already been claimed (U.S. Pat. 2,973,347).

On the other hand, no information is found on the use of aromatic compounds containing alcoholic hydroxyl groups as stabilizers for polyvinylidene halides.

THE INVENTION

Now, the subject of the invention is thermostabilized, chlorine-containing polymers and copolymers, as well as molding compounds made therefrom, which are characterized by the fact that polyhydroxyl compounds derived from benzene, having 2 to 6 hydroxyl groups in the α position to the benzene ring, and having the general formula

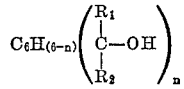

wherein $R_1$ and $R_2$ represent hydrogen or lower alkyl radicals and $n$ represents the numbers 2 to 6, are used as thermal stabilizers.

The polyhydroxyl compounds of the invention are incorporated into the chlorine-containing polymers generally in quantities of 0.1 to 5%, preferably 0.25 to 2%, of the weight of the polymers.

The stabilizers of the invention can be used in combination with known thermal stabilizers, whereby a better stabilizing action is often improved than when either component is used alone, or the amount of both components can be reduced while achieving the same stabilizing action (see examples).

The action of the above-named compounds as thermal stabilizers is connected with the α position of the hydroxyl groups in relation to the benzene nucleus, and does not occur until there are at least 2 hydroxyl groups.

By lower alkyl radicals are meant those having 1 to 8 carbon atoms, preferably the radicals methyl-, ethyl-, n and i propyl- and the isomeric butyl radicals.

Preferred are the isomeric bis-(α-hydroxyalkyl)-benzenes, tris-(α-hydroxyalkyl)-benzenes and hexa-(α-hydroxyalkyl)-benzenes, on account of their easy accessibility. The following are used advantageously:

1,4-bis-(hydroxymethyl)-benzene
1,4-bis-(α-hydroxyethyl)-benzene
1,3,5-tris-(hydroxymethyl)-benzene
1,2,4-tris-(hydroxymethyl)-benzene
1,3,5-tris-(α-hydroxyethyl)-benzene
1,2,4-tris-(α-hydroxyethyl)-benzene
1,3,5-tris-(α-hydroxy-α-methylethyl)-benzene
hexa-(hydroxymethyl)-benzene
hexa-(α-hydroxyethyl)-benzene.

The preparation of the above-named compounds is well known to persons skilled in the art and can be performed by the cyclotrimerization of suitable alkinols (German Auslegeschrifts 1,159,951 and 1,468,677) or by hydrogenation of the corresponding di- and triacetylbenzene, among other methods (Am. Chem. Soc. 72 (1950) 2038).

The stabilizers of the invention can be used alone or in mixtures with one another, and also in the form of mixtures of their stereoisomers or optical isomers.

By chlorine-containing polymers and copolymers in the framework of the invention are meant polyvinylidene chloride and its copolymers, polyvinyl chloride and its copolymers, chlorinated polyolefins and postchlorinated polyvinyl chloride, a chlorine content being the only limiting qualification. Chlorine-containing copolymers include those made from a chlorine-containing monomer and one or more additional chlorine-containing or non-chlorine-containing ethylenically unsaturated monomers such as vinyl acetate, vinyl propionate, ethylene, propylene, acrylonitrile, acrylic acid acrylic ester, methacrylic acid alkyl ester, esters of higher mono-unsaturated acids, vinyl ethers, etc. Also to be considered as chlorine-containing polymers are mixtures of polymers, both those of chlorine-containing polymers and copolymers together, and those of a chlorine-containing polymer with a non-chlorine-containing polymer, especially such as those which are added in the form of ethylene-vinyl acetate copolymers or copolymers or graft polymers of acrylonitrile, butadiene and styrene (ABS) or of methacrylic acid alkyl ester with butadiene and styrene (MBS) to improve the impact strength of manufactured products.

By molding compounds made from the named chlorine-containing polymers and copolymers are meant those technically common preparations which contain, in addition to the polymers, other additives which consist, among other things, of plasticizers, lubricants, inert fillers, stabilizers against the action of light, and other adjuvant substances.

The incorporation of the stabilizers of the invention into the polymers is performed by common procedures, such as kneading on the calender or mixing by means of high-speed mixing mechanisms into powders or granules of the polymers.

In the examples the quantities stated in percent are percentages by weight.

Example 1

In each case 100 g. of vinylidene chloride copolymer was rolled together with 5 g. of acetyl tributyl citrate as plasticizer, 0.3 g. each of ethylene diamine distearate and calcium stearate, plus the amounts of stabilizer specified in Table 1, for a period of 10 minutes at 140–150° C. on nickel roller, to produce a sheet material 0.3 mm. thick.

The test films thus produced were tested for thermostability by a static test in which they were hung in an oven at 160° C., specimens being taken every 15 minutes and examined for discoloration.

The discoloration was judged on the basis of the following scale:

0=colorless
1=pale yellow
2=yellow
3=brownish yellow
4=brown
5=dark brown
6=black The numerals 1 and 2 present minimal discoloration scarcely exceeding the natural color of the polymers.

In Table 1 the results are shown for a suspension copolymer consisting of 85% vinylidene chloride and 15% vinyl chloride (K value 49).

TABLE 1

| | Stabilizer | Quantity added, percent | Discoloration at 160° C. after— | | | | | |
|---|---|---|---|---|---|---|---|---|
| | | | 0 min. | 15 min. | 30 min. | 45 min. | 60 min. | 75 min. |
| A | Epoxidized soya oil (6.9% epoxy oxygen) | 1 | 2 | 3 | 4 | 5 | 6 | 6 |
| | | 2 | 2 | 3 | 4 | 5 | 5 | 6 |
| B | Pentaerythritol | 0.5 | 2 | 3 | 3-4 | 4 | 5 | 6 |
| | | 1 | 1-2 | 2-3 | 3 | 4 | 4 | 5 |
| C | Trimethylolpropane laurate | 1 | 1 | 2 | 3 | 4 | 5-6 | 6 |
| | | 2 | 1 | 2-3 | 3 | 3-4 | 5 | 6 |
| D | Bisphenol-A-bis-(epoxypropane) | 1 | 3 | 3 | 4 | 5 | 6 | 6 |
| | | 2 | 2 | 3 | 4 | 4-5 | 5 | 6 |
| E | 1,3,5-tris-(α-hydroxyethyl)-benzene (=TEB) | 0.5 | 1 | 2 | 3 | 4 | 4 | 5 |
| | | 1 | 1 | 2 | 3 | 3 | 4 | 5 |
| F | Trimethylolpropane monolaurate with TEB added | 2+0.5 | 0-1 | 1 | 3 | 3 | 4 | 4 |
| G | Bisphenol A-bis-(epoxypropane plus TEB) | 1+0.5 | 2 | 2-3 | 3 | 4 | 5 | 6 |
| H | 1:1 mixture of 1,3,5- and 1,2,4-tris-(hydroxy-methyl)-benzene | 0.5 | 2 | 2-3 | 3 | 4 | 5 | 6 |
| | | 1 | 1-2 | 2 | 3 | 3-4 | 4 | 5 |
| | | 1.5 | 1 | 2 | 3 | 3-4 | 4 | 5 |

Table 1 shows, in comparison to other thermostabilizers (A to D) the superior action of the stabilizers of the invention (E to H) which in the same quantity produce a better effect than prior-art stabilizers.

As it will appear from E and F, the addition of quantities of 1 and 1.5 wt.-percent does not make the action substantially better than the addition of 0.5 wt.-percent, and comparison with A to D shows that even smaller quantities of the stabilizers of the invention produce better action than larger quantities of the prior-art stabilizers.

Table 2 lists the thermostabilities determined on a vinylidene chloride-vinyl chloride copolymer of a weight ratio of 77:23 (K value 56). The test temperature was 150° C., since the test films melt at higher temperatures.

TABLE 2

| | Stabilizer | Quantity added, percent | Discoloration at 150° C. after— | | | | | | |
|---|---|---|---|---|---|---|---|---|---|
| | | | 0 min. | 15 min. | 30 min. | 45 min. | 60 min. | 75 min. | 90 min. |
| A | Epoxidized soya oil (6.9% epoxy oxygen content) | 1 | 3 | 3 | 4 | 5 | 5 | 6 | 6 |
| | | 2 | 3 | 3 | 3-4 | 4 | 4 | 5 | 6 |
| B | 1,3,5-tris-(α-hydroxy-ethyl)-benzene | 0.5 | 1-2 | 2 | 3 | 3-4 | 4 | 5 | 6 |
| | | 1 | 1 | 1-2 | 2 | 3 | 3-4 | 4 | 6 |
| | | 1.5 | 1 | 1-2 | 2 | 3 | 3-4 | 4 | 5 |
| C | 1:1 mixture of 1,3,5- and 1,2,4-tris-(α-hydroxyethyl)-benzene | 0.5 | 1-2 | 2 | 3 | 4 | 4 | 5 | 6 |
| | | 1 | 1-2 | 2 | 2 | 3 | 4 | 4 | 5 |
| D | 1,3,5-tris-(α-hydroxy-α-methyl-ethyl)-benzene | 0.5 | 2 | 2 | 3 | 4 | 4-5 | 5 | 6 |
| | | 1 | 1 | 1-2 | 2 | 3 | 4 | 4 | 5 |

According to Table 2 again, very small additions of 0.5 wt. percent of stabilizers according to the invention excel the action of the prior-art stabilizer (A) even though the latter was added in larger quantities.

Example 2

A suspension polyvinyl chloride with a K value of 70 was mixed with 1% cadmium stearate, 4% chalk, 4% of an ethylene-vinyl acetate copolymer containing 45% vinyl acetate (Levapren 450) made by Farbenfabriken Bayer, Leverkusen, and the quantities of stabilizers listed in Table 3, and rolled for 10 minutes at 170° C. into 0.3 mm. films.

The results of the thermostability testing (static oven test) performed as in Example 1 but at 190° C. are shown in Table 3.

TABLE 3

| Stabilizer | Quantity added, percent | Discoloration at 190° C. after— | | | | | | |
|---|---|---|---|---|---|---|---|---|
| | | 0 min. | 15 min. | 30 min. | 45 min. | 60 min. | 75 min. | 90 min. |
| No stabilizer | 1 | 1 | 1-2 | 2 | 3-4 | 5 | 6 | 6 |
| Epoxidized soya oil | 1 | 0-1 | 1 | 1-2 | 3 | 3-4 | 5 | 6 |
| 1,3,5-tris-(α-hydroxyethyl)-benzene | 0.5 | 0 | 1 | 2 | 2-3 | 4 | 5 | 5 |
| | 1 | 0 | 0-1 | 1 | 2 | 3 | 4 | 5 |

Example 3

A suspension polymer of 85% vinylidene chloride, 10% vinyl chloride and 5% acrylic acid methyl ester having a K value of 45 was rolled into test films 0.3 mm. thick together with 0.3% calcium stearate, 0.3% ethylenediamine distearate, 5% acetyl tributyl citrate and the amounts of stabilizer listed in Table 4 and subjected to the static oven test at 150° C. The discoloration values are compared in Table 4.

TABLE 4

| Stabilizer | Amount added, percent | Discoloration at 150° C. after— | | | | | | |
|---|---|---|---|---|---|---|---|---|
| | | 0 min. | 15 min. | 30 min. | 45 min. | 60 min. | 75 min. | 90 min. |
| Bisphenol A-bis-(epoxy-propane) (approx. 8% epoxy oxygen) | 2 | 2 | 2-3 | 3 | 3 | 4 | 4 | 5 |
| Epoxidized soya oil | 2 | 2 | 2-3 | 3 | 3-4 | 4 | 5 | 5 |
| 1,3,5-tris-($\alpha$-hydroxyethyl)-benzene | 0.5 | 1-2 | 2 | 2 | 3 | 3-4 | 4 | 4-5 |
| | 0.75 | 0-1 | 1 | 1-2 | 2 | 3 | 3-4 | 4 |
| 1:1 mixture of 1,3,5- and 1,2,4-tris-(hydroxymethyl)-benzene | 0.5 | 1 | 1-2 | 2 | 3 | 3-4 | 4 | 5 |
| | 1 | 0-1 | 1 | 1-2 | 2 | 2-3 | 3 | 4 |
| | 1.5 | 0-1 | 1 | 1-2 | 2 | 2-3 | 3 | 3-4 |

Polymer mixtures of chlorinated PVC (62 wt. percent Cl) and PVC (K value 65) in weight ratios of (a) 90:10 and (b) 82:18 were stabilized in the same manner as in Table 4 and tested for thermostability at 170° C. The results are the same as in Table 4.

Example 4

A suspension terpolymer of 88% vinylidene chloride, 8% n-dodecylacrylate and 4% n-butylacrylate (K value 48, Vicat temperature 83° C.) was rolled together with 5% acetyl tributyl citrate, 0.3% calcium stearate and 0.3% ethylenediamine distearate plus the stabilizers of Table 5, at a temperature of 140° C. to form test films 0.3 mm. thick. The oven test was performed at 160° C. and gave the results shown in the following table.

TABLE 5

| Stabilizer | Amount added, percent | Discoloration at 160° C. after— | | | | | | |
|---|---|---|---|---|---|---|---|---|
| | | 0 min. | 15 min. | 30 min. | 45 min. | 60 min. | 75 min. | 90 min. |
| Trimethylolpropane mono-laurate | 2 | 1 | 1-2 | 2 | 2-3 | 3 | 4 | 4-5 |
| Epoxidized soya oil | 1 | 2-3 | 3 | 3 | 4 | 4 | 5 | 6 |
| | 2 | 2 | 3 | 3 | 4 | 4 | 5 | 6 |
| Trimethylolpropane mono-laurate plus 1,3,5-tris-($\alpha$-hydroxyethyl)-benzene | 2+0.5 | 0-1 | 1 | 1-2 | 2 | 2 | 3 | 3-4 |
| 1,3,5-tris-($\alpha$-hydroxy-ethyl)-benzene | 0.5 | 0-1 | 0-1 | 1-2 | 3 | 3-4 | 4-5 | 5 |
| | 1 | 0-1 | 0-1 | 1-2 | 2-3 | 3 | 3 | 4 |
| | 1.5 | 0 | 0 | 1-2 | 2 | 2-3 | 3 | 3-4 |
| | 2 | 0 | 0 | 1-2 | 1 | 2 | 3 | 3-4 |
| 1,3,5-tris-($\alpha$-hydroxy-$\alpha$-methylethyl)-benzene | 0.5 | 1 | 1 | 2 | 2-3 | 3 | 4 | 5 |
| | 1 | 0-1 | 1 | 2 | 2-3 | 3 | 3-4 | 4-5 |
| 1,4-bis-($\alpha$-hydroxyethyl)-benzene | 0.5 | 0-1 | 1 | 2 | 2-3 | 3 | 4 | 4-5 |
| | 1.0 | 0-1 | 1 | 2 | 2-3 | 3 | 4 | 4-5 |

As it appears from Table 5, the stabilizers of the invention are especially well suited to copolymers on the basis of vinylidene chloride and acrylic ester.

By "suspension" polymer, copolymer or terpolymer is meant a polymer polymerized in aqueous medium wherein the monomer is finely divided and the polymerization catalyst is dissolved in said monomer.

What is claimed is:

1. Thermostabilized chlorine-containing, organic polymer composition comprising at least one of a polyvinylidene chloride polymer, a polyvinylchloride polymer, a chlorinated polyolefin polymer, and a postchlorinated polyvinyl chloride polymer, in admixture, as a thermostabilizing agent in an amount effective to improve the thermostability thereof, at least one polyhydroxyalkyl substituted benzene of the formula

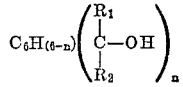

wherein $R_1$ and $R_2$ represent hydrogen or lower alkyl and $n$ is 2 to 6.

2. Composition according to claim 1, containing 0.1 to 5 wt. percent of said agent based on the weight of the polymer.

3. Composition according to claim 1, containing 0.25 to 2 wt. percent of said agent based on the weight of the polymer.

4. Composition according to claim 1, said agent being at least one of the group:

1,4-bis-(hydroxymethyl)-benzene
1,4-bis-($\alpha$-hydroxyethyl)-benzene
1,3,5-tris-(hydroxymethyl)-benzene
1,2,4-tris-(hydroxymethyl)-benzene
1,3,5-tris-($\alpha$-hydroxyethyl)-benzene
1,2,4-tris-($\alpha$-hydroxyethyl)-benzene
1,3,5-tris-($\alpha$-hydroxy-$\alpha$-methylethyl)-benzene
hexa-(hydroxymethyl)-benzene
hexa-($\alpha$-hydroxyethyl)-benzene.

5. Composition according to claim 1, said polymer being vinylidene chloride polymer.

6. Composition according to claim 1, said polymer being vinyl chloride polymer.

7. Composition according to claim 1, said polymer being chlorinated polyolefin.

8. Composition according to claim 1, said polymer being postchlorinated polyvinyl chloride.

9. Composition according to claim 1, said polymer being a copolymer of vinylidene chloride and vinyl chloride.

10. Composition according to claim 1, said polymer being a copolymer of vinylidene chloride and acrylic ester.

References Cited

UNITED STATES PATENTS

| | | | |
|---|---|---|---|
| 3,062,895 | 11/1962 | Martin et al. | 260—618 |
| 3,267,145 | 8/1966 | Lund et al. | 260—618 |
| 3,062,882 | 11/1962 | Parris | 260—618 |
| 2,806,883 | 9/1957 | Mikeska et al. | 260—618 |
| 3,030,427 | 4/1962 | Earhart et al. | 260—618 |
| 3,022,355 | 2/1962 | Earhart et al. | 260—618 |
| 2,542,417 | 2/1951 | Kleinschmidt | 260—618 |

FOREIGN PATENTS 797,054   6/1958   Great Britain.

DONALD E. CZAJA, Primary Examiner

V. P. HOKE, Assistant Examiner